(12) United States Patent
Namizuka

(10) Patent No.: US 7,443,524 B2
(45) Date of Patent: Oct. 28, 2008

(54) IMAGE PROCESSING APPARATUS, AND METHOD OF REMOTE CONTROLLING THE IMAGE PROCESSING APPARATUS

(75) Inventor: Yoshiyuki Namizuka, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 1057 days.

(21) Appl. No.: 10/360,749

(22) Filed: Feb. 10, 2003

(65) Prior Publication Data

US 2003/0160999 A1  Aug. 28, 2003

(30) Foreign Application Priority Data

Feb. 28, 2002  (JP) .............................. 2002-052694

(51) Int. Cl.
*G06F 15/00* (2006.01)
*G06F 15/16* (2006.01)

(52) U.S. Cl. ...................................... 358/1.15; 709/203

(58) Field of Classification Search ................ 358/1.15, 358/1.9; 717/173; 709/206, 203, 217; 395/712
See application file for complete search history.

(56) References Cited

U.S. PATENT DOCUMENTS

| | | | |
|---|---|---|---|
| 5,687,006 A | 11/1997 | Namizuka et al. | |
| 5,715,070 A | 2/1998 | Tone et al. | |
| 5,740,333 A | 4/1998 | Yoh et al. | |
| 5,787,288 A * | 7/1998 | Nagata et al. | ................ 717/173 |
| 6,211,967 B1 | 4/2001 | Namizuka | |
| 6,747,754 B1 * | 6/2004 | Iyoki | ......................... 358/1.15 |
| 6,833,926 B1 | 12/2004 | Takano et al. | |
| 6,854,000 B2 | 2/2005 | Ikegami et al. | |
| 6,930,785 B1 * | 8/2005 | Weyand et al. | ................ 358/1.1 |
| 2001/0050778 A1 | 12/2001 | Fukuda et al. | |
| 2001/0055125 A1 | 12/2001 | Yamada et al. | |
| 2002/0036643 A1 | 3/2002 | Namizuka et al. | |
| 2002/0054323 A1 | 5/2002 | Yamada et al. | |
| 2002/0085229 A1 | 7/2002 | Ikegami et al. | |
| 2002/0126313 A1 | 9/2002 | Namizuka | |
| 2003/0160999 A1 | 8/2003 | Namizuka | |
| 2005/0062984 A1 | 3/2005 | Ikegami et al. | |

FOREIGN PATENT DOCUMENTS

| | | |
|---|---|---|
| JP | 11-282690 | 10/1999 |
| JP | 11-327378 | 11/1999 |

(Continued)

OTHER PUBLICATIONS

U.S. Appl. No. 10/360,749, filed Feb. 10, 2003, Namizuka.

(Continued)

*Primary Examiner*—Saeid Ebrahimi Dehkordy
(74) *Attorney, Agent, or Firm*—Oblon, Spivak, McClelland, Maier & Neustadt, P.C.

(57) ABSTRACT

The support center inputs the data for updating the processing functions of the image processing apparatus to the apparatus via the LAN. The first non-volatile memory for system control temporarily stores the updating data via the image memory access controller. The second non-volatile memory for system control temporarily stores the updating data via the image memory access controller and the image data controller. The process controller stores the program and the data into the program RAM and the data RAM of the image processor via the image data controller, and updates the processing functions.

8 Claims, 16 Drawing Sheets

FOREIGN PATENT DOCUMENTS

| | | |
|---|---|---|
| JP | 2001-76125 | 3/2001 |
| JP | 2001-103219 | 4/2001 |
| JP | 2001-156968 | 6/2001 |
| JP | 2001-195245 | 7/2001 |
| JP | 2002-14834 | 1/2002 |

OTHER PUBLICATIONS

U.S. Appl. No. 10/632,957, filed Aug. 4, 2003, Namizuka.
U.S. Appl. No. 10/078,713, filed Feb. 19, 2002, Namizuka.
U.S. Appl. No. 09/960,944, filed Sep. 25, 2001, Namizuka et al.
U.S. Appl. No. 09/847,192, filed May 2, 2001, Fukuda et al.
U.S. Appl. No. 09/551,509, filed Apr. 17, 2000, Namizuka et al.
U.S. Appl. No. 09/654,050, filed Sep. 1, 2000, Miyazaki et al.
U.S. Appl. No. 09/665,054, filed Sep. 19, 2000, Takahashi et al.
U.S. Appl. No. 09/693,987, filed Oct. 23, 2000, Kawamoto et al.
U.S. Appl. No. 09/705,836, filed Nov. 6, 2000, Oteki et al.
U.S. Appl. No. 09/704,624, filed Nov. 3, 2000, Namizuka.
U.S. Appl. No. 09/706,783, filed Nov. 7, 2000, Miyazaki et al.
U.S. Appl. No. 09/706,781, filed Nov. 7, 2000, Oteki et al.
U.S. Appl. No. 09/713,194, filed Nov. 16, 2000, Namizuka et al.
U.S. Appl. No. 09/725,569, filed Nov. 30, 2000, Namizuka et al.
U.S. Appl. No. 09/735,649, filed Dec. 14, 2000, Fukuda et al.
U.S. Appl. No. 09/748,240, filed Dec. 27, 2000, Yoshizawa et al.
U.S. Appl. No. 09/748,262, filed Dec. 27, 2000, Namizuka et al.
U.S. Appl. No. 09/749,819, filed Dec. 28, 2000, Fukuda et al.
U.S. Appl. No. 09/770,214, filed Jan. 29, 2001, Oteki et al.
U.S. Appl. No. 09/772,945, filed Jan. 31, 2001, Oteki et al.
U.S. Appl. No. 09/801,843, filed Mar. 9, 2001, Fukuda et al.
U.S. Appl. No. 11/129,311, filed May 16, 2005, Namizuka et al.
U.S. Appl. No. 11/129,338, filed May 16, 2005, Namizuka et al.

\* cited by examiner

IMAGE PROCESSING APPARATUS, AND METHOD OF REMOTE CONTROLLING THE IMAGE PROCESSING APPARATUS

BACKGROUND OF THE INVENTION

1) Field of the Invention

The present invention relates to an image processing apparatus that updates the digital image data processing by remote control, and a method of controlling the image processing apparatus.

2) Description of the Related Art

The copying machine, the facsimile, the printer, the scanner, and the composite device having functions of these units have the image processing functions of processing digital image data. Techniques for diagnosing the functions and operations of these office automation devices and updating their image processing functions by programming based on remote control have been disclosed.

According to the technique disclosed in Japanese Patent Application Laid-open Publication No. 11-327378, it is possible to manage the state of an image processing apparatus by remote diagnosis, and report counter values and jam records to a service center. This technique also employs a simple functional updating device to update the image processing function by rewriting the firmware.

Japanese Patent Application Laid-open Publication No. 2001-076125 and Japanese Patent Application Laid-open Publication No. 2001-156968 disclose techniques for transferring the processing information to a host buffer of the image processing apparatus in advance. The processor receives the program via the host buffer, and rewrites or adds the image processing functions and the like. Based on this arrangement, it is possible to execute a plurality of kinds of image processing without lowering the productivity even when the apparatus is operating.

The conventional techniques require the insertion of an IC card or the like into the image processing apparatus in offline, in order to update the image processing functions of the apparatus. As the operator must move to the image processing apparatus that requires the updating and directly operate the apparatus, it has not been possible to improve the work efficiency of the updating of the functions. Because of this reason, the apparatus does not receive a substantial updating of the image processing functions once the apparatus has been shipped from the plant.

SUMMARY OF THE INVENTION

It is an object of the present invention to provide a technology that solves at least the above-mentioned problems.

The image processing apparatus according to one aspect of the present invention has a take-in unit that takes in a data for updating the function of a processing unit; a temporary storing unit that temporarily stores the data; and a data updating unit that reads the data stored in the temporary storing unit and stores the data into a storing unit into which data necessary for updating a function of the processing unit is stored when executing the updating of the function.

The method of remote controlling an image processing apparatus according to another aspect of the present invention includes the steps of taking in a data for updating the function of a processing unit from a remote apparatus via a communication line; temporarily storing the data; and reading the data and storing the data into a storing unit into which data necessary for updating a function of the processing unit is stored when executing the updating of the function.

These and other objects, features and advantages of the present invention are specifically set forth in or will become apparent from the following detailed descriptions of the invention when read in conjunction with the accompanying drawings.

DETAILED DESCRIPTION

Exemplary embodiments of the image processing apparatus and the method of remote controlling the image processing apparatus according to the present invention will be explained in detail below with reference to the accompanying drawings.

Figure 1:
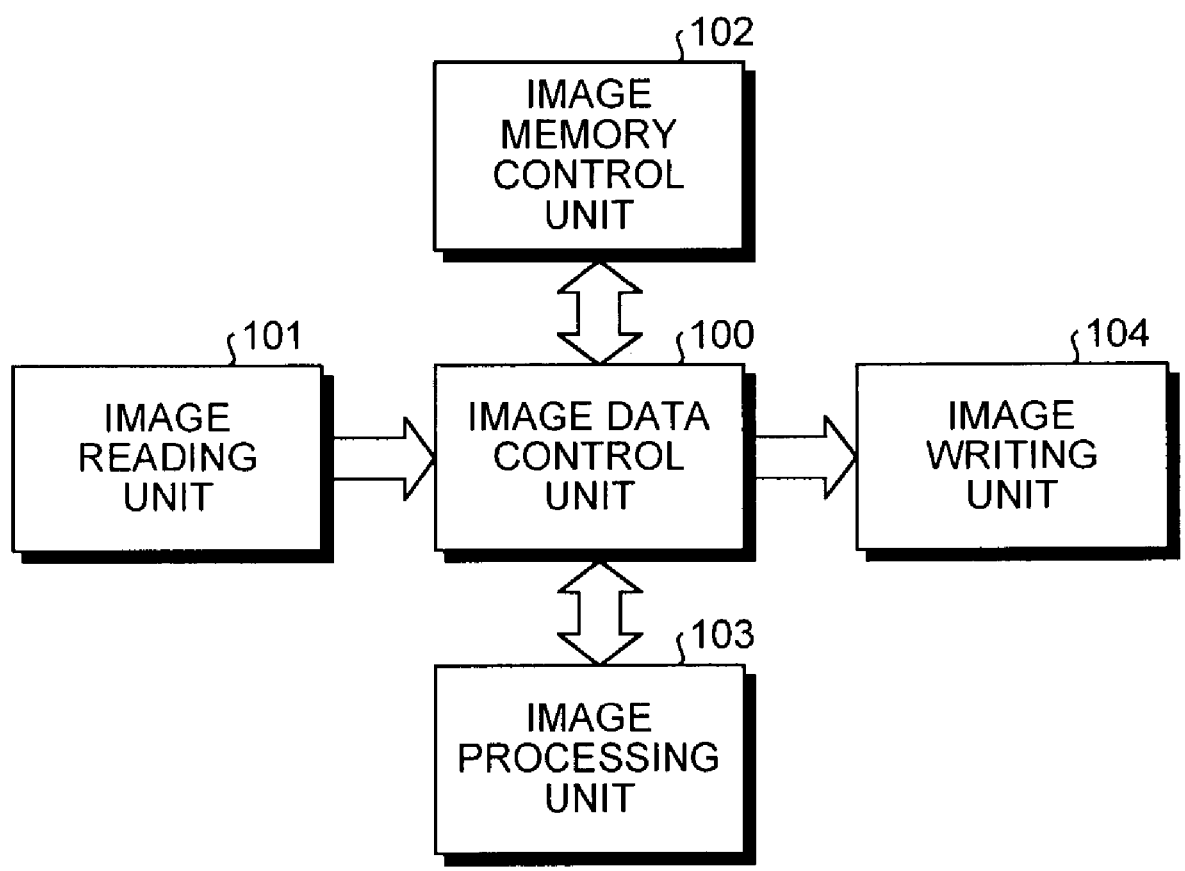
FIG. 1 is a block diagram that shows units that perform various functions in an image processing apparatus according to an embodiment of the present invention.

The principle of the image processing apparatus according to the present embodiment will be explained first. FIG. 1 is a block diagram that shows units that perform various functions in the image processing apparatus according to the embodiment of the present invention.

The image processing apparatus includes an image data control unit 100, an image reading unit 101 that reads image data, an image memory control unit 102 that writes/reads the image data by controlling an image memory that stores images, an image processing unit 103 that executes image processing such as editing of the image data, and an image writing unit 104 that writes the image data onto transcription paper or the like.

Each of the image reading unit 101, the image memory control unit 102, the image processing unit 103, and the image writing unit 104 is connected to the image data control unit 100, with the image data control unit 100 as a center. Each of these units will be described in detail below.

Image Data Control Unit 100

The image data control unit 100 executes the following kinds of processing,
 (1) a data compression processing to improve the data transfer efficiency of the data bus (primary compression),
 (2) a transfer of the primary compressed data to the image data,
 (3) an image combining processing (i.e., the combining of image data from a plurality of units, and the processing including the data combining on the data bus),
 (4) an image shift processing (i.e., the shift of images to the main scanning direction or the sub-scanning direction),
 (5) an image area expansion processing (i.e., the expanding of the image area to the periphery by an optional quantity),
 (6) an image magnification change processing (e.g., changing the magnification to a fixed rate of 50% or 200%),
 (7) a parallel bus interface processing,
 (8) a serial bus interface processing (i.e., the interface with a process controller 211 to be described later),
 (9) a data format conversion between the parallel data and the serial data,
 (10) an interface processing to process the interface with the image reading unit 101, and
 (11) an interface processing to process the interface with the image processing unit 103.

The Image Reading Unit 101

The image reading unit 101 executes the following kinds of processing,
 (1) a reading of light reflected from a document with an optical system,
 (2) a conversion of the read signal into an electric signal with a charge-coupled device (CCD),
 (3) a digital processing with an A/D converter,
 (4) a shading correction processing (i.e., a correction of a variation in the luminance distribution of the light from the light source), and
 (5) a scanner γ correction processing (i.e., a correction of the density characteristics of the reading system).

The Image Memory Control Unit 102

The image memory control unit 102 executes the following kinds of processing,
 (1) a control processing of the interface with the system controller,
 (2) a parallel bus control processing (i.e., a control of the interface with the parallel bus),
 (3) a network control processing,
 (4) a serial bus control processing (i.e., a control of a plurality of external serial ports),
 (5) an internal bus interface control processing (i.e., a command control with a console section),
 (6) a local bus control processing (i.e., a control of access to a ROM, a RAM, and font data to start the system controller),
 (7) a control processing of the operation of a memory module (i.e., a write/read control of the memory module, and the like),
 (8) a control processing of access to the memory module (i.e., an intermediate adjustment of memory access requests from a plurality of units),
 (9) a data compression/expansion processing (i.e., reducing the data quantity for effective utilization of the memory), and
 (10) an image edit processing (i.e., a clearing of data in the memory area, a rotation of image data, a combining of images on the memory, and the like).

The Image Processing Unit 103

The image processing unit 103 executes the following kinds of processing,
 (1) a shading correction processing (i.e., a correction of a variation in the luminance distribution of the light from the light source),
 (2) a scanner γ correction processing (i.e., a correction of the density characteristics of the reading system),
 (3) an MTF (modulation transfer function) correction processing,
 (4) a smoothing processing,
 (5) an optional magnification change processing in the main scanning direction,
 (6) a density conversion (i.e., γ correction, which corresponds to a density notch),
 (7) a simple multi-valuing processing,
 (8) a simple binary processing,
 (9) an error diffusion processing,
 (10) a dither processing,
 (11) a dot array phase control processing (e.g., rightward dots, and leftward dots),
 (12) an isolation point removal processing,
 (13) an image area separation processing (i.e., a color decision, an attribute decision, and an adaptation processing), and
 (14) a density conversion processing.

The Image Writing Unit 104

The image writing unit 104 executes the following kinds of processing,
 (1) an edge smoothing processing (i.e., a jagged-image correction processing),
 (2) a correction processing to carry out a dot re-arraying,
 (3) a pulse control processing of an image signal, and
 (4) a data format conversion between the parallel data and the serial data.

Hardware Structure of the Digital Composite Device

Figure 2:
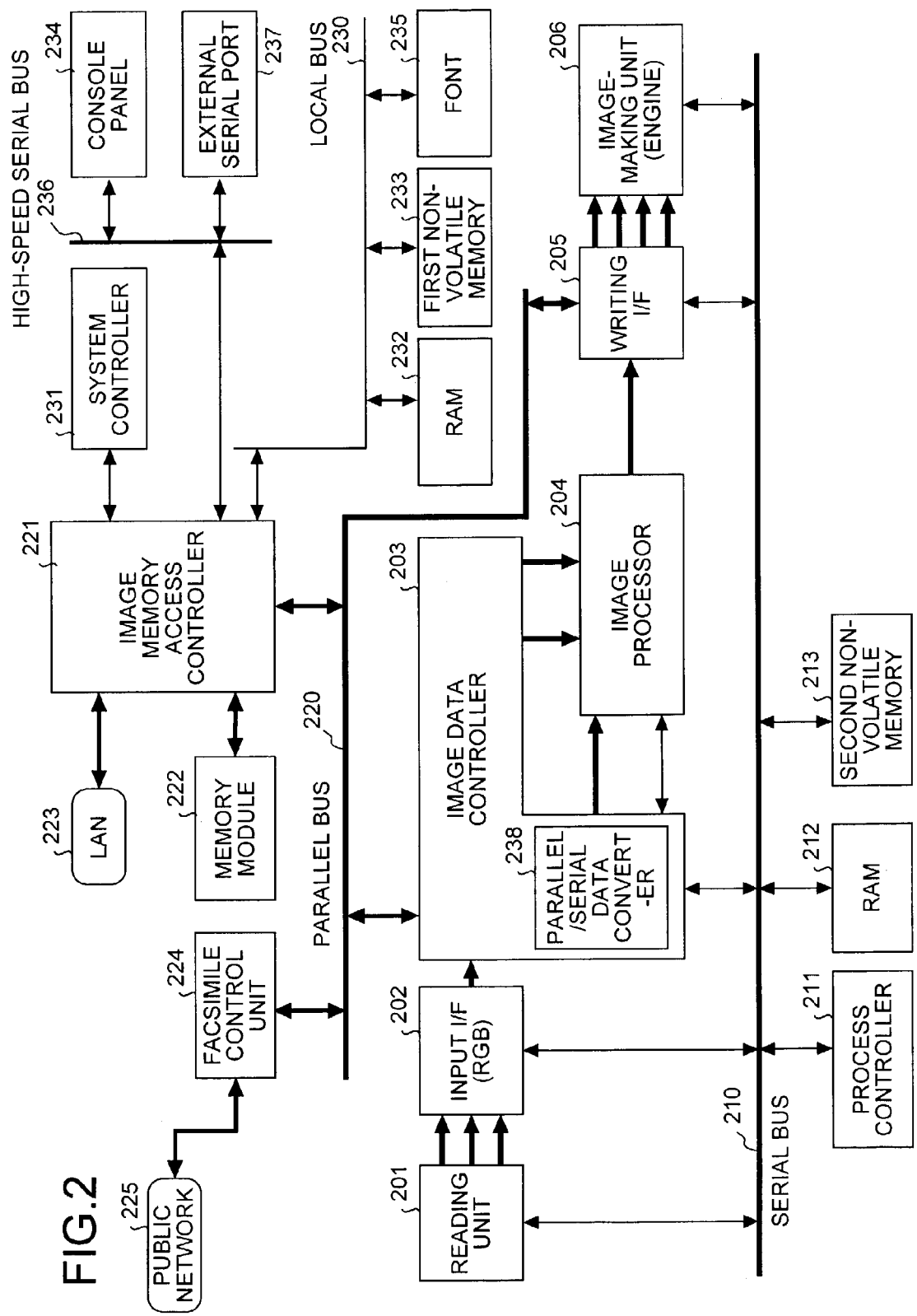
FIG. 2 is a block diagram that shows one example of a hardware structure of the image processing apparatus according to the embodiment of the present invention.

The hardware structure of the digital composite device that is constituted by the image processing apparatus according to the present embodiment will be explained next. FIG. 2 is a block diagram that shows one example of the hardware structure of the image processing apparatus according to the embodiment.

In the block diagram shown in FIG. 2, the image processing apparatus according to the present embodiment comprises a reading unit 201, an input interface (I/F) 202, an image data controller 203, an image processor 204, a writing I/F 205, and an image-making unit (engine) 206. Further, the image processing apparatus according to the present embodiment comprises a process controller 211, a RAM 212, and a second non-volatile memory 213, via a serial bus 210.

Further, the image processing apparatus according to the present embodiment comprises an image memory access controller 221, and a facsimile control unit 224, via a parallel bus 220. The image memory access controller 221 is connected to a memory module 222, and a system controller 231. The image memory access controller 221 is further connected to a RAM 232, a first non-volatile memory 233, and a font memory 235, via a local bus 230. The image memory access controller 221 is further connected to a console panel 234, and an external serial port 237, via a high-speed serial bus 236.

A relationship between the above sections that constitute the image processing apparatus and the units 100 to 104 shown in FIG. 1 will be explained next. The reading unit 201 and the input I/F 202 realize the functions of the image reading unit 101 shown in FIG. 1. The image data controller 203 similarly realizes the functions of the image data control unit 100. The image processor 204 realizes the functions of the image processing unit 103.

The writing I/F 205 and the image-making unit (engine) 206 similarly realize the functions of the image writing unit 104. The image memory access controller 221 and the memory module 222 realize the functions of the image memory control unit 102.

The contents of the above sections that constitute the image processing apparatus will be explained below. The reading unit 201 includes a lamp, a mirror, and a lens, to optically read a document. The lamp irradiates light onto the document, and the mirror and the lens condense the light reflected from the document onto an image pick-up device.

The image pick-up device, such as a CCD, is mounted on the input I/F 202. The CCD converts the image data into an electric signal, and converts the signal into a digital signal. Then, the I/F 202 outputs (transmits) the digital signal.

The image data controller 203 receives the image data output from the I/F 202. The image data controller 203 controls the whole transfer of the image data between the functional devices (the processing units) and the data bus.

The image data control unit 203 has a parallel/serial data converter 238 to transfer the image data between the input I/F 202, the parallel bus 220, and the image processor 204. The image data control unit 203 executes image data communications between the process controller 211 and the system controller 231 that controls the whole image processing apparatus. The RAM 212 is used as a work area for the process controller 211. The second non-volatile memory 213 stores a boot program and the like for the process controller 211 to control the process.

The input I/F 202 transfers the image data to the image processor 204 via the image data controller 203. The image processor 204 corrects the signal degraded in the optical system and also degraded due to the quantization of the signal to a digital signal (i.e., the signal degradation in the scanner system). The image processor 204 outputs the corrected signal to the image data controller 203.

The image memory access controller 221 controls the writing/reading of the image data to/from the memory module 222. The image memory access controller 221 also controls the operation of each section connected to the parallel bus 220. The RAM 232 is used as a work area for the system controller 231. The first non-volatile memory 233 stores a boot program and the like for the system controller 231 to control the system.

From the console panel 234, an operator inputs the processing items to be executed by the image processing apparatus. For example, the operator operates the console panel 234 to input a type of processing such as a copying, a facsimile transmission, an image reading, or a printing, and the number of pieces of paper to be processed. It is possible to input the image data control information.

There are two kinds of jobs for handling the read image data, a job of storing the read image data into the memory module 222 and utilizing this stored image data, and a job of not storing the image data into the memory module 222. When the image on one document paper is to be copied onto a plurality of sheets of paper, the reading unit 201 is operated only once to read this image, and store the image into the memory module 222. The copying machine reads the stored data by a plurality of times to make copy onto the sheets of paper.

When the image on one document paper is to be copied onto only one sheet of paper, the read image data may be reproduced straight. Therefor, in this case, the image memory access controller 221 does not need to make access to the memory module 222.

When the memory module 222 is not used, the image processor 204 transfers the data to the image data controller 203, and the image data controller 203 processes the data and returns the data to the image processor 204 again. The image processor 204 executes the image quality processing to change the luminance data obtained by the CCD of the input I/F 202 into area gradation data.

After the image quality processing, the image processor 204 transfers the image data to the writing I/F 205. The writing I/F 205 executes a post-processing including the dot arraying to the area gradation signal and a pulse control of the signal to reproduce the dots. Then, the image-making unit 206 forms the reproduction image on the transcription paper.

The flow of the image data from when the data is stored into the memory module 222 till when the additional processing is executed to the image data read from the memory module, such as the rotation of the image direction and the combining of images, will be explained. The image processor 204 transfers the image data to the image data controller 203, and the image data controller 203 transfers the processed image data to the image memory access controller 221 via the parallel bus 220.

Based on the control carried out by the system controller 231, the image memory access controller 221 controls access to the image data stored in the memory module 222, develops print data input via the LAN 223, inputs data by remote control as explained later, and compresses/expands the image data to effectively utilize the memory module 222.

The image memory access controller 221 executes a predetermined image processing (only at the necessary time to be described later in detail) to the received image data, compresses the image data, and stores the data in the memory module 222. The image memory access controller 221 reads the stored image data when necessary. The image memory access controller 221 expands the image data read from the memory module 222 to obtain the original image data. Then, the image memory access controller 221 returns the image data to the image data controller 203 via the parallel bus 220.

The image data controller 203 transfers the image data to the image processor 204. The image processor 204 processes the image quality, and the writing I/F 205 controls the pulse of the image data. The image-making unit 206 forms the reproduction image on the transcription paper.

It is possible to realize the functions of the digital composite device by using the parallel bus 220 and the bus control of the image data controller 203 based on the above flow of the image data. The digital composite device executes the facsimile transmission function as follows. The image processor 204 processes the read image data, and transfers the processed image data to the facsimile control unit 224 via the image data controller 203 and the parallel bus 220. The facsimile control unit 224 converts the image data to the data adapted to the communication network, and transmits the converted data as facsimile data to a public network (PN) 225.

On the other hand, when the digital composite device has received facsimile data, the facsimile control unit 224 converts the data received from the network into image data. The facsimile control unit 224 transfers the image data to the image processor 204 via the parallel bus 220 and the image data controller 203. In this case, the facsimile control unit 224 does not specifically process the image quality. The writing I/F 205 re-arrays dots and controls the pulse of the image data, and the image-making unit 206 forms the reproduction image on the transcription paper.

When a plurality of jobs such as the copying function, the facsimile transmission/reception function, and the printer output function are operated in parallel, the system controller 231 and the process controller 211 control the allocation to each job of the right of using the reading unit 201, the image-making unit 206, and the parallel bus 220.

The process controller 211 controls the image data flow, and the system controller 231 controls the system as a whole and manages the starting of each resource. The operator selectively inputs the functions of the digital composite device from the console panel 234, thereby to set the processing contents of the copying function, the facsimile function, or the like.

The system controller 231 and the process controller 211 communicate with each other via the parallel bus 220, the image data controller 203, and the serial bus 210 respectively. Specifically, the parallel/serial data converter 238 of the image data controller 203 converts the data format at the data interface between the parallel bus 220 and the serial bus 210, thereby to achieve the data communications between the system controller 231 and the process controller 211.

Image Processing Unit 103 and Image Processor 204

Figure 3:
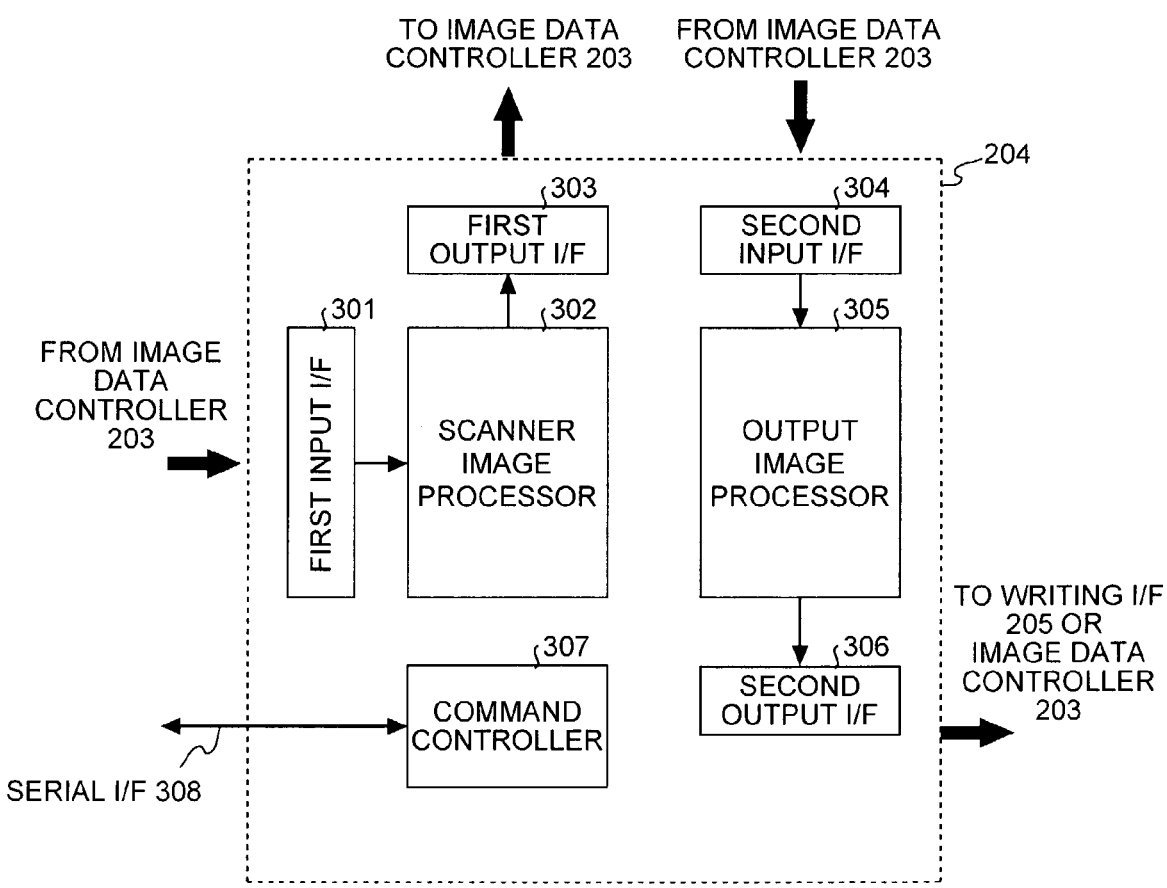
FIG. 3 is a block diagram that shows the outline of the processing executed by an image processor in the image processing apparatus according to the embodiment of the present invention.

The outline of the processing executed by the image processor 204 that constitutes the image processing unit 103 will be explained next. FIG. 3 is a block diagram that shows the outline of the processing executed by the image processor 204 in the image processing apparatus according to the present embodiment.

In the block diagram shown in FIG. 3, the image processor 204 comprises a first input interface (I/F) 301, a scanner image processor 302, a first output interface (I/F) 303, a second input interface (I/F) 304, an output image processor 305, and a second output interface (I/F) 306.

In the above structure, the reading unit 201 reads the image data, and transfers the read image data to the first input I/F 301 of the image processor 204, via the input I/F 202 and the image data controller 203. The first input I/F 301 transfers the image data to the scanner image processor 302.

The scanner image processor 302 corrects the shading, corrects the scanner γ, corrects the MTF and the like, to correct the degraded read image data. The scanner image processor 302 can also change the magnification of the image to enlarge/contract the image, although this is not the correction processing. After finishing the read image data correction processing, the scanner image processor 302 transfers the image data to the image data controller 203 via the first output I/F 303.

For outputting the image data to the transcription paper, the second input I/F 304 receives the image data from the image data controller 203, and the output image processor 305 executes the area gradation processing. The output image processor 305 outputs the image data after the image quality processing to the writing I/F 205 or the image data controller 203 via the second output I/F 306.

The area gradation processing that the output image processor 305 executes includes the density conversion processing, the dither processing, the error diffusion processing, and the like. The approximation of the area of the gradation information is the main processing. Once the memory module 222 stores the image data processed by the scanner image processor 302, the output image processor 305 can modify the image quality processing and confirm various kinds of reproduction images.

For example, it is possible to change easily the atmosphere of the reproduction image by changing the density of the reproduction image or by changing the number of lines of the dither matrix. In this case, it is not necessary to restart reading the image from the reading unit 201 each time when the processing is changed, but it is possible to quickly execute different kinds of processing to the same image data many times, by reading the image data stored in the memory module 222.

When the system comprises a single scanner, this scanner executes the image processing and the gradation processing at the same time, and outputs the result to the image data controller 203. It is possible to change the contents of the processing by programming. A command controller 307 manages the switching of the processing and the changing of the processing order, via a serial I/F 308.

Figure 4:
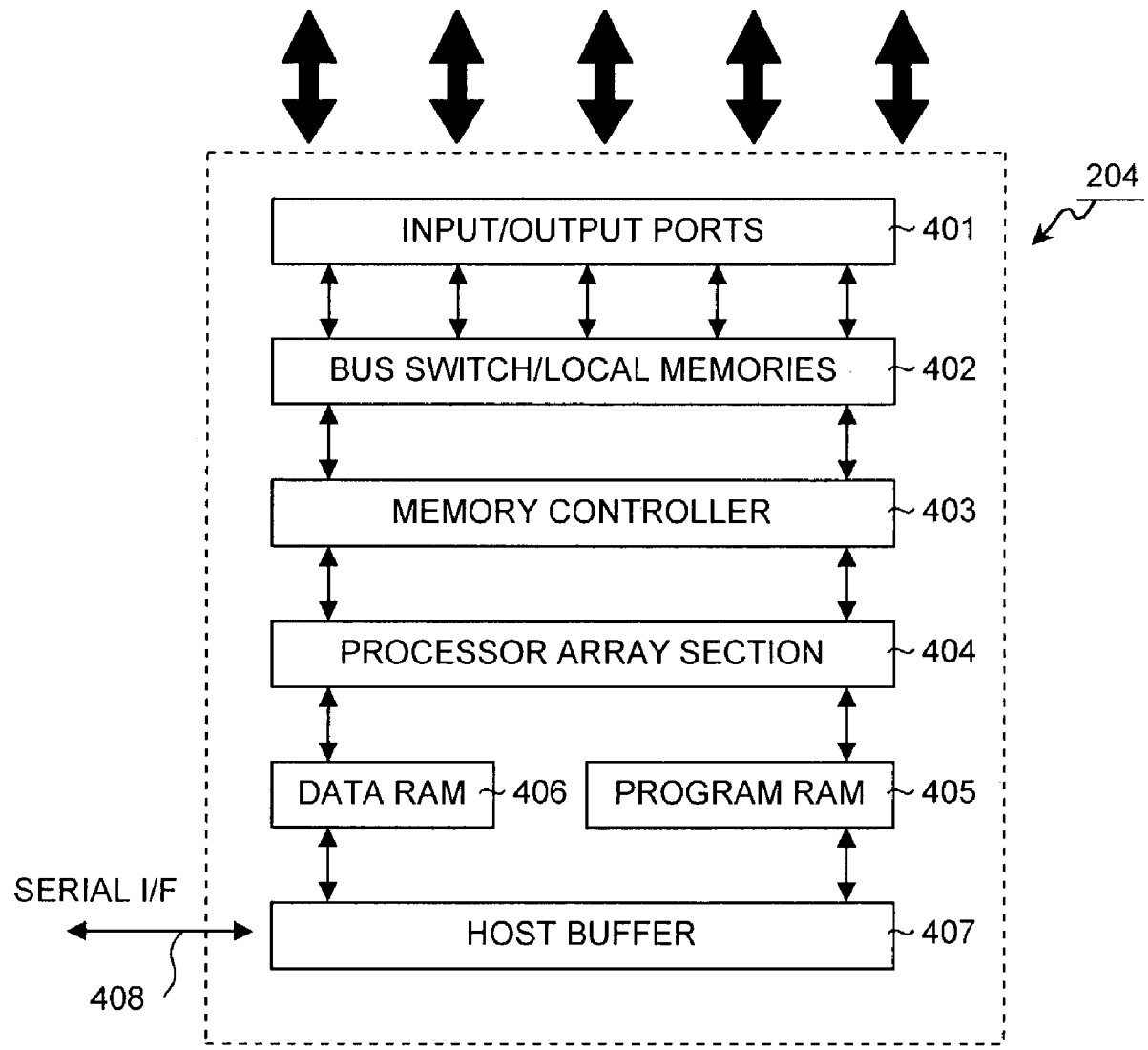
FIG. 4 is a block diagram that shows an internal structure of the image processor of the image processing apparatus according to the embodiment of the present invention.

The internal structure of the image processor 204 will be explained next. FIG. 4 is a block diagram that shows the internal structure of the image processor 204 of the image processing apparatus according to the present embodiment. In the block diagram shown in FIG. 4, the image processor 204 has a plurality of input/output ports 401 to input/output data from/to the outside, and can optionally set data input and output to these ports.

The image processor 204 includes bus switch/local memories 402 that are connected to the input/output ports 401. A memory controller 403 controls memory areas and data bus routes to be used. The bus switch/local memories 402, allocated as buffer memories, store the input data and the data to be output respectively, and control the I/F with the outside.

A processor array section 404 executes various kinds of processing to the image data stored in the bus switch/local memories 402, and outputs the processed image data to the bus switch/local memories 402 again for these memories 402 to store the image data. The processor array section 404 obtains the processing sequence and parameters form a program RAM 405 and a data RAM 406.

The process controller 211 downloads the contents of the program RAM 405 and the data RAM 406 to a host buffer 407 via a serial I/F 408. The serial I/F 408 is the same as the serial I/F 308 shown in FIG. 3. The process controller 211 reads the contents of the data RAM 406, and monitors the process of the processing.

In order to change the processing contents or change the processing mode required in the system, the operator updates the contents of the program RAM 405 and the data RAM 406 that the processor array section 404 refers to. It is possible to updates the processing contents following the change of the processing mode, by remote control as described later.

Image Data Control Unit 100 and Image Data Controller 203

Figure 5:
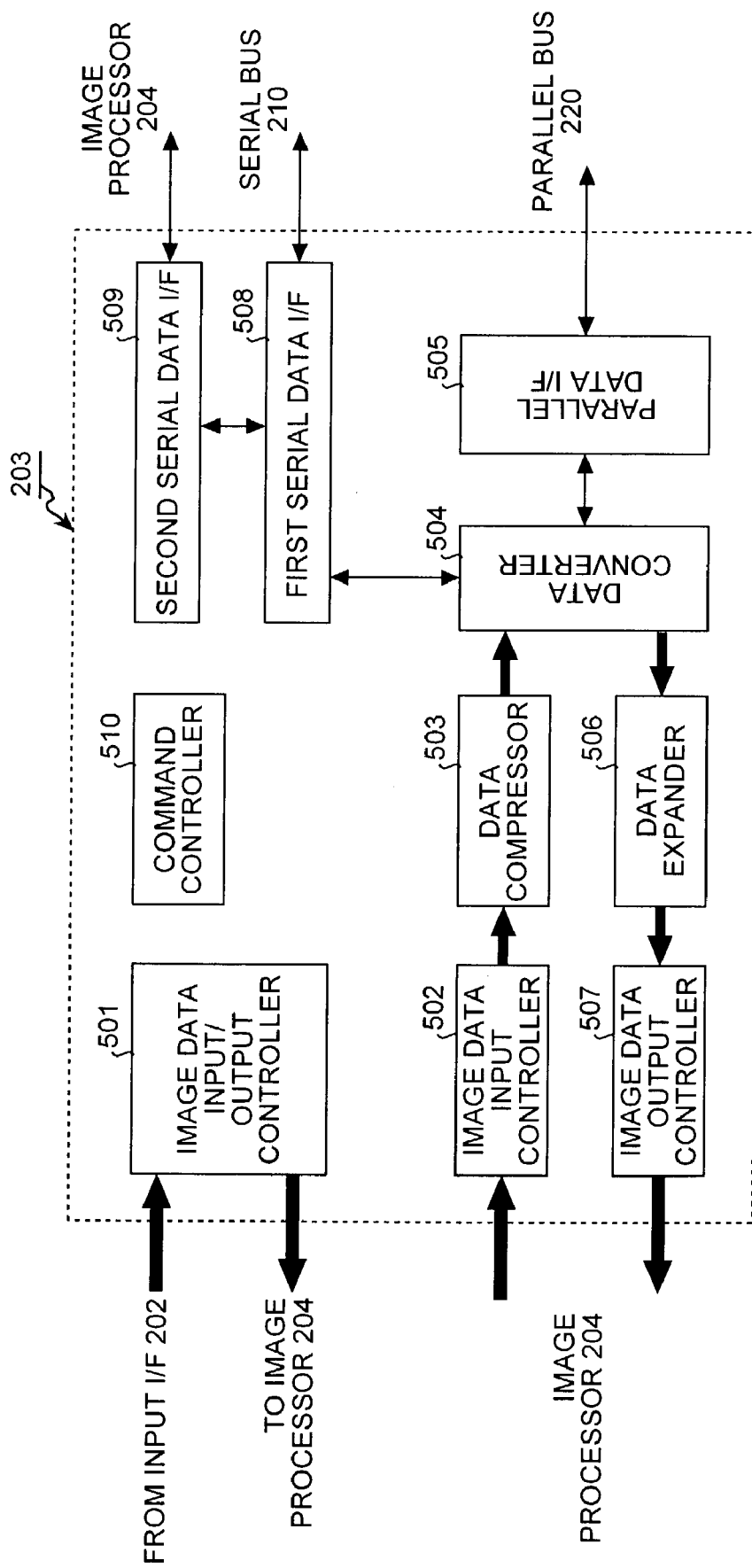
FIG. 5 is a block diagram that shows the outline of the processing executed by an image data controller in the image processing apparatus according to the embodiment of the present invention.

The outline of the processing executed by the image data controller 203 that constitutes the image data control unit 100 will be explained next. FIG. 5 is a block diagram that shows the outline of the processing executed by the image data controller 203 in the image processing apparatus according to the present embodiment.

In the block diagram shown in FIG. 5, an image data input/output controller 501 inputs (receives) the image data from the input I/F 202, and outputs (transmits) the image data to the image processor 204. In other words, the image data input/output controller 501 connects between the image reading unit 101 and the image processing unit 103 (that is, the image processor 204). Therefore, the image data input/output controller 501 is an exclusive input/output section that only transmits the image data read by the image reading unit 101 to the image processing unit 103.

An image data input controller 502 inputs (receives) the image data corrected with the scanner of the image processor 204. In order to improve the transfer efficiency of the input image data in the parallel bus 220, a data compressor 503 compresses the input image. The Data compressor 503 transfers the compressed image data to a data converter 504, which transfers the image data to the parallel bus 220 via a parallel data I/F 505.

The data converter 504 receives the compressed image data input from the parallel bus 220 via the parallel data I/F 505. The data converter 504 transfers the compressed image data to a data expander 506, which expands the image data. An image data output controller 507 transfers the expanded image data to the image processor 204.

The image data controller 203 also comprises the function of data conversion between the parallel data and the serial data. The system controller 231 transfers the data to the parallel bus 220. The process controller 211 transfers the data to the serial bus 210. The image data controller 203 converts the data for communications between the two controllers.

The serial data I/F has a first serial data I/F 508 for exchanging data with the process controller 211 via the serial bus 210, and a second serial data I/F 509 for exchanging data with the image processor 204. With the existence of the one independent system between the serial I/F and the image processor 204, the interface with the image processor 204 becomes smooth.

Based on the input instructions, a command controller 510 controls the operation of the sections and the interfaces within the image data controller 203.

Image Writing Unit 104 and Writing I/F 205

Figure 6:
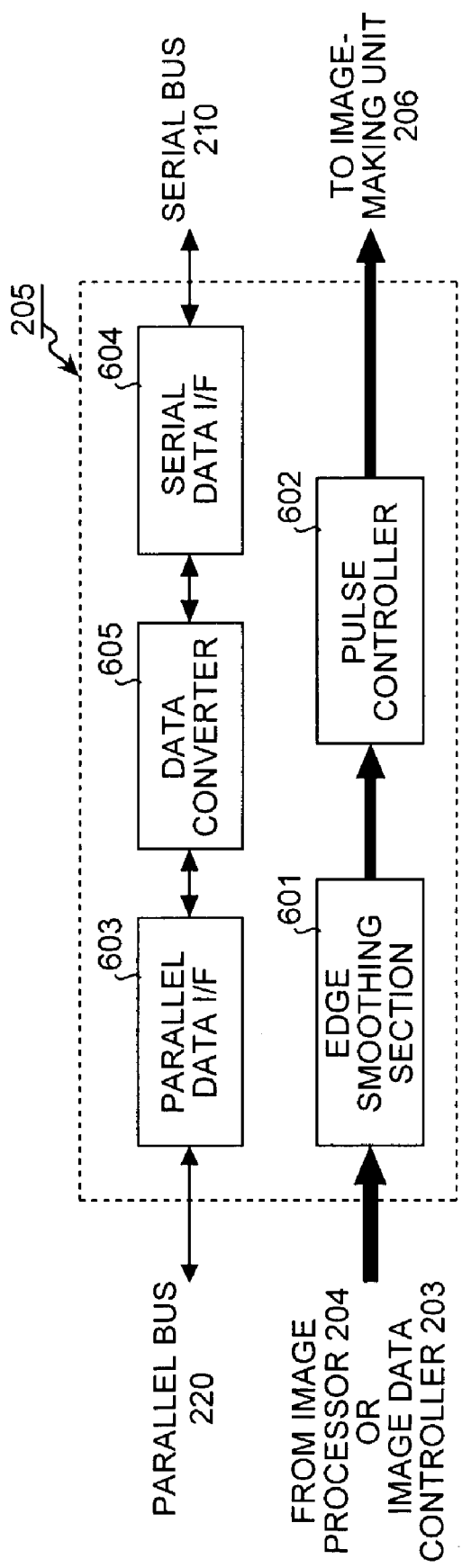
FIG. 6 is a block diagram that shows the outline of the processing executed by a writing interface (I/F) in the image processing apparatus according to the embodiment of the present invention.

The outline of the processing executed by the writing I/F 205 that constitutes a part of the image writing unit 104 will be explained next. FIG. 6 is a block diagram that shows the outline of the processing executed by the writing I/F 205 in the image processing apparatus according to the present embodiment.

In the block diagram shown in FIG. 6, the writing I/F 205 executes the additional processing to the input image data according to the characteristics of the image-making unit 206. In other words, an edge smoothing section 601 smoothes the edges of the image to re-array the dots, and a pulse controller 602 controls the pulse of the image signal to form the dots. The pulse controller 602 outputs the processed image data to the image-making unit 206.

The writing I/F 205 has a function of converting the data format between the parallel data and the serial data, in addition to the image data conversion function. The writing I/F 205 as a single unit can make it possible to carry out communications between the system controller 231 and the process controller 211. In other words, the writing I/F 205 comprises a parallel data I/F 603 that transmits/receives the parallel data, a serial data I/F 604 that transmits/receives the serial data, and a data converter 605 that converts the data formats of the data received by the parallel data I/F 603 and the serial data I/F 604 respectively.

Image Memory Control Unit 102 and Image Memory Access Controller 221

Figure 7:
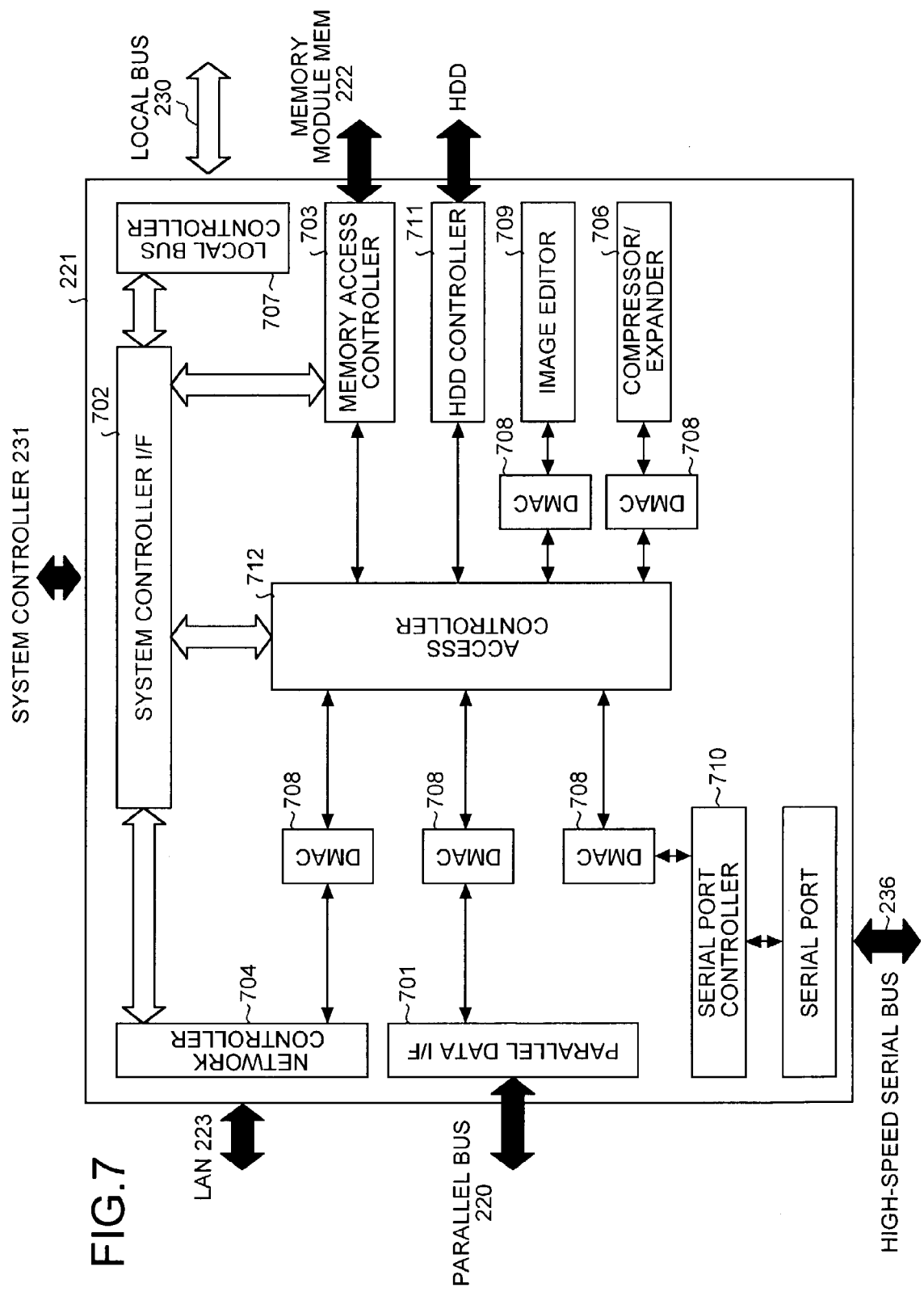
FIG. 7 is a block diagram that shows the outline of the processing executed by an image memory access controller in the image processing apparatus according to the embodiment of the present invention.

The outline of the processing executed by the image memory access controller 221 that constitutes a part of the image memory control unit 102 will be explained next. FIG. 7 is a block diagram that shows the outline of the processing executed by the image memory access controller 221 in the image processing apparatus according to the present embodiment.

In the block diagram shown in FIG. 7, the image memory access controller 221 manages the interface of the image data with the parallel bus 220, and controls the access to the image data stored in the memory module 222, that is, the storing (writing)/reading of the image data. Further, the image memory access controller 221 controls the development of code data, input from an external PC via mainly the LAN 223, into the image data. The external PC (a support center to be described later) inputs the updating data relating to the updating of the functions of the image processing apparatus, via the LAN 223.

The image memory access controller 221 comprises a parallel data I/F 701, a system controller I/F 702, a memory access controller 703, a network controller 704, a compressor/expander 706, a local bus controller 707, a transfer controller (a direct memory access controller, DMAC) 708, an image editor 709, a serial port controller 710, a hard disk drive (HDD) controller 711, and an access controller 712 that collectively controls the total operation.

The parallel data I/F 701 manages the interface of the image data with the parallel bus 220. The memory access controller 703 controls the access to the image data stored in the memory module 222, that is, the storing (writing)/reading of the image data.

The network controller 704 stores the input code data in the local area. The access controller 712 develops the code data stored in the network controller 704 into the image data, based on the development processing instruction from the system controller 231 input via the system controller I/F 702.

The memory module 222 stores the developed image data or the image data from the parallel bus 220 input via the parallel data I/F 701. The access controller 712 selects the image data to be stored. The compressor/expander 706 compresses the image data to improve the memory utilization efficiency. The memory access controller 703 stores (writes) the image data into the memory module 222 while managing the address of the memory module 222.

The memory access controller 703 controls the address of the read destination of the image data stored in the memory module 222. The compressor/expander 706 expands the read image data, and transfers the expanded image data to the parallel bus 220 via the parallel data I/F 701.

The image editor 709 that is provided in the image memory access controller 221 executes a predetermined image processing to the input image data. The image editor 709 processes the image before the compressor/expander 706 compresses the image data, mainly based on the assumption that the memory module 222 stores the processed image data.

Data Flow When the Scanner Reads the Image Data

Figure 8:
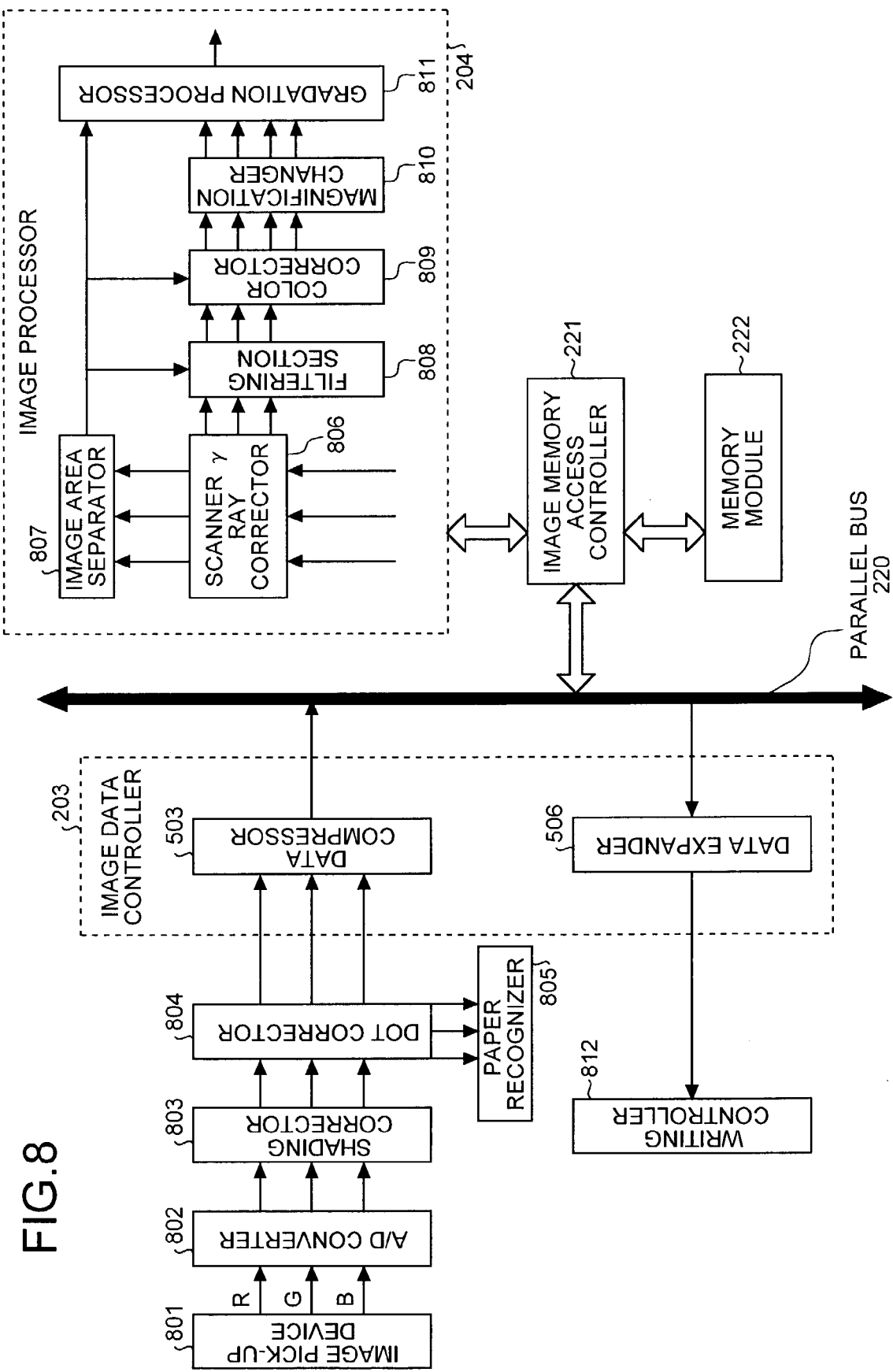
FIG. 8 is a flowchart that explains a scanner image processing flow according to the embodiment of the present invention.

FIG. 8 explains the flow of the scanner image processing, including the process that the reading unit 201 reads the document, the image processing unit 103 processes the image, and the memory module 222 of the image memory control unit 102 stores the processed image data.

The reading unit 201 includes a lamp, a mirror, and a lens, to optically read a document. The lamp irradiates light onto the document, and the mirror and the lens condense the light reflected from the document onto an image pick-up device 801.

A CCD that constitutes the image pick-up device 801 converts the image data into an electric signal. An A/D converter 802 converts the signal into a digital signal. A shading corrector 803 corrects the shading of the read image data to correct the degraded image data. A dot corrector 804 corrects the dots, and a paper recognizer 805 recognizes the paper, and inputs the result to the image data control unit 203. The data compressor 503 of the image data control unit 203 compresses the data, and transfers the compressed image data to the scanner image processor 302 of the image processor 204 via the parallel bus 220 and the image memory access controller 221.

The scanner image processor 302 selectively executes the processing. A scanner γ corrector 806 corrects the scanner γ. Based on the image area separation information from an image area separator 807, a filtering section 808 filters image colors, and a color corrector 809 corrects the colors. A magnification changer 810 changes the magnification of the image, and a gradation processor 811 process the gradation of the image. After the image correction processing, the image processor 204 selectively transfers the read image data to the memory module 222 for data storage via the image memory access controller 221, or to the image data controller 203 via the image memory access controller 221. The data expander 506 expands the image data transferred to the image data controller 203, and a writing controller 812 of the image writing unit 104 transfers the image data to the image-making unit (engine) 206, which forms the reproduction image onto the transcription paper.

Data Flow When the Memory Stores the Image Data

Figure 9:
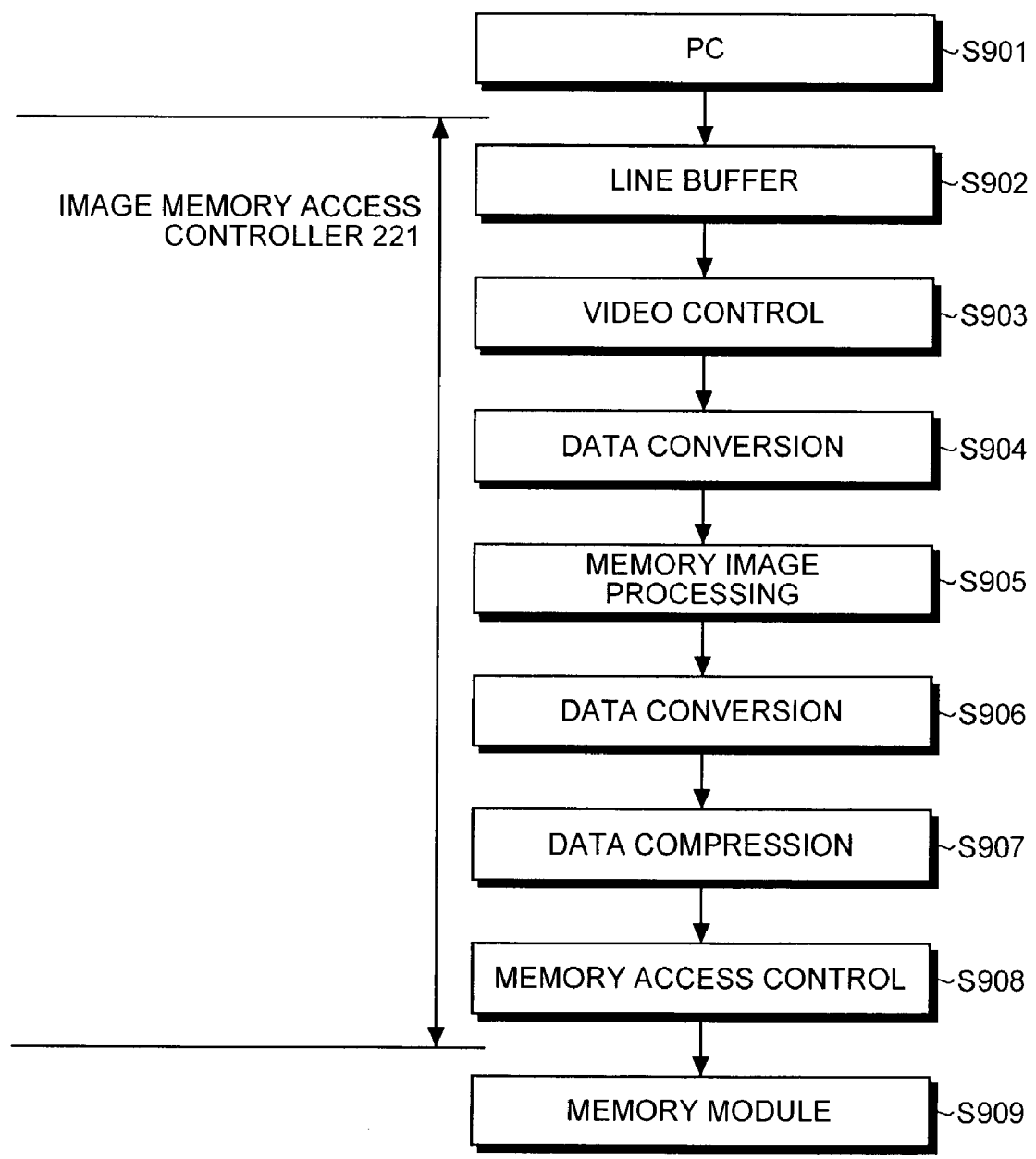
FIG. 9 explains one example of an image data flow in the image memory access controller of the image processing apparatus according to the embodiment of the present invention.

The processing that the memory module 222 stores the image will be explained next. FIG. 9 explains the data flow when the memory module 222 of the image processing apparatus according to the present embodiment stores the image. FIG. 9 shows the flow of the data from when the external PC inputs the data to the image processing apparatus via the LAN 223 till when the memory module 222 stores the data.

In FIG. 9, first, the PC outputs the image data (step S901). The image memory access controller 221 receives the input image memory via the LAN 223, and the line buffer of the network controller 704 holds the image data (step S902). The image memory access controller 221 executes the video control (step S903), converts the data (step S904), executes a predetermined image processing (step S905), converts the data (step S906), compresses the data (step S907), and executes the access control to the memory module 222 (step S908). Then, the memory module stores the image data (step S909).

The Processing Units Provided in the Image Processor 204 and the Image Memory Access Controller 221

The processing units provided in the image processor 204 and the image memory access controller 221 respectively will be explained next. A Single Instruction stream Multiple Data stream (SIMD) type processing unit (SIMD type processor) or a sequential processing unit (sequential processor) is selectively provided in the image processor 204 and the image memory access controller 221 according to the function respectively.

Updating of the Functions of the Image Processing Apparatus and Remote Control

A remote control updating of the functions of the image processing apparatus, which is the main processing of the present invention, will be explained next. The updating of the functions includes the updating of the control that the system controller 231 and the process controller 211 execute, and the updating of the firmware relating to the image processing that the image processor 204 executes.

More specifically, the updating of the functions includes the following,
(1) updating the control of the system controller and the process controller, and the updating the firmware of the IPP (Internet Printing Protocol) processing by remote control, via the public network or other network,
(2) updating the version to obtain a new function, via the network, and
(3) updating the function by remote control without involving the user's awareness about the updating work.

The image processing apparatus is connected to the PC, not shown, provided in the support center at a remote place, via the public network 225 or the LAN 223. It is possible to update the above functions by remote control from the support center.

The functions are updated as follows,
(1) update the command with the system controller 231 via the image memory access controller 221,
(2) after starting the system controller 231, set the image processing apparatus to the updating waiting state based on communications between the system controller 231 and the process controller 211,
(3) download the updating data (firmware) onto first non-volatile memory and the second non-volatile memory via the public network 225 or the LAN 223, and
(4) execute the programmable instruction of the image processor 204 based on the control from the process controller 211.

The above updating of the functions is executed by downloading the updating data after the setup through the exchange of command between the PC in the support center and the image processing apparatus.

Updating via the LAN

Figure 10:
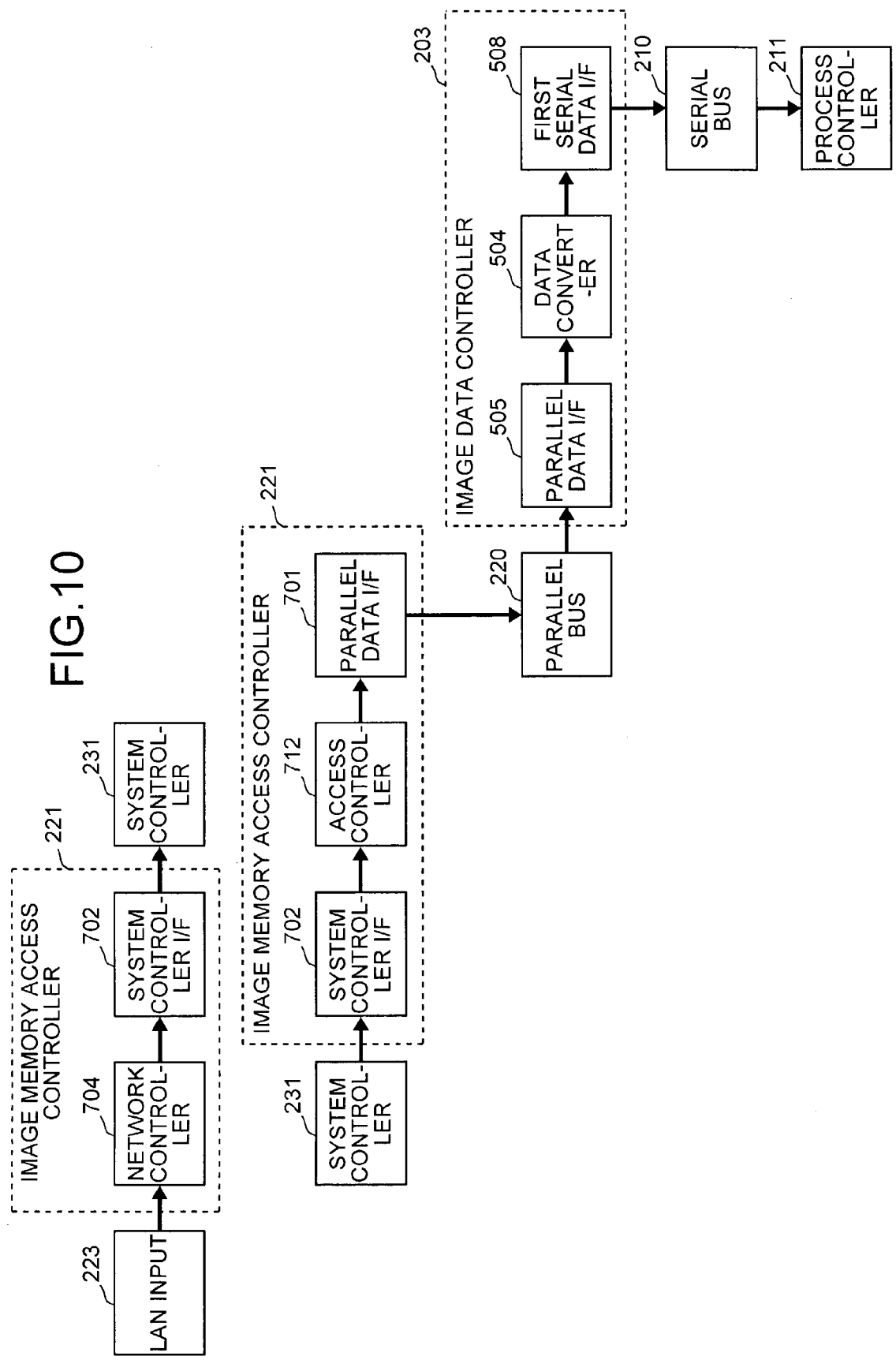
FIG. 10 is a data flowchart for updating a command based on the input via a LAN according to the embodiment of the present invention.

FIG. 10 is a data flowchart for updating the command. The image memory access controller 221 receives the input of command updating data from the LAN 223. The image memory access controller 221 communicates with the system controller 231 (i.e., the network controller 704, and the system controller I/F 702). The system controller 231 recognizes the command based on the header information of the updating data transferred.

The system controller 231 communicates with the process controller 211, via the image memory access controller 221 (i.e., the system controller I/F 702, the access controller 712, and the parallel data I/F 701), the parallel bus 220, the image data controller 203 (i.e., the parallel data I/F 50, the data converter 504, and the first serial data I/F 508), and via the serial bus 210, respectively. The system controller 231 sets the image processing apparatus to the updating waiting state.

Figure 11:
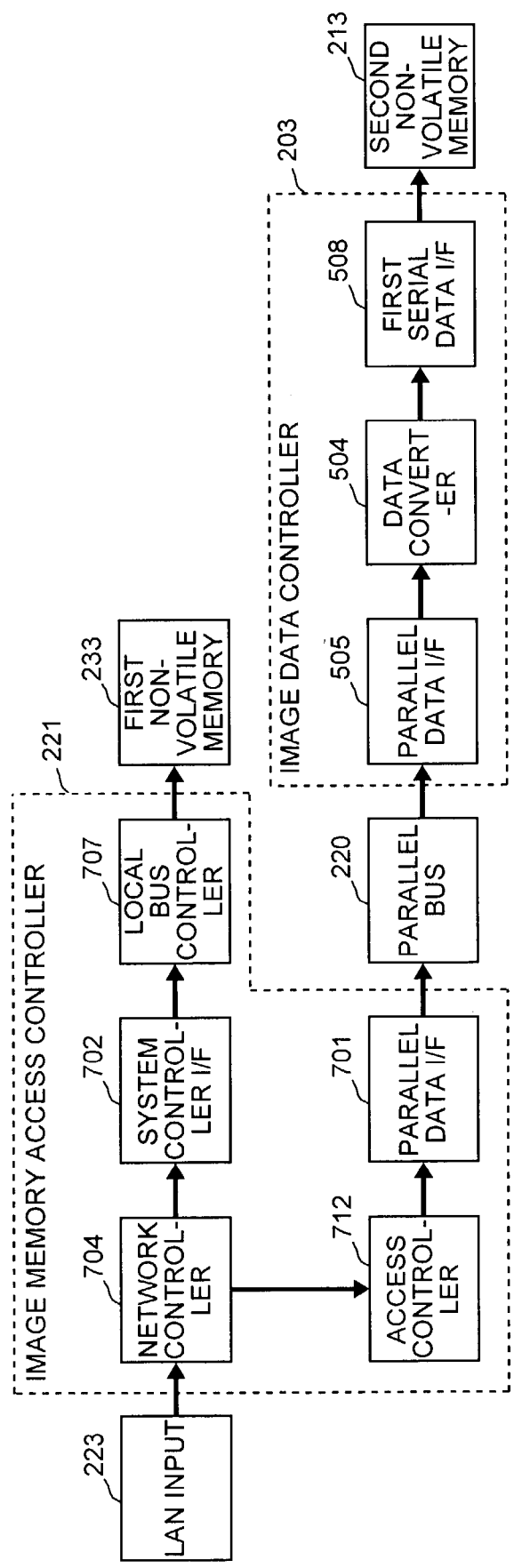
FIG. 11 is a data flowchart for updating firmware based on the input via a LAN according to the embodiment of the present invention.

FIG. 11 is a data flowchart for updating the firmware from the support center. For updating the firmware, the system controller and the process controller set the image processing apparatus to the updating waiting state. The image memory access controller 221 obtains the firmware updating data from the support center via the LAN 223. The image memory access controller 221 updates the contents of the first non-volatile memory 233 for system control, and the contents of the second non-volatile memory 213 for process control.

After the system controller 231 and the process controller 211 set the updating waiting state, the support center transfers the firmware updating data to the image memory access controller 221 via the LAN 223. For updating the system control firmware, the image memory access controller 221 transfers the received system control firmware updating data to the first non-volatile memory 233, via the network controller 704, the system controller I/F 702, and the local bus controller 707 of the image memory access controller 221 respectively. The first non-volatile memory 233 stores this system control firmware updating data, and updates the contents.

For updating the process control firmware, the image memory access controller 221 transfers the received process control firmware updating data to the second non-volatile memory 213, via the network controller 704, the access controller 712, and the parallel data I/F 701 of the image memory access controller 221 respectively, and via the parallel bus 220, and the parallel data I/F 505, the data converter 504, and the first serial data I/F 508 of the image data controller 203, respectively. The second non-volatile memory 213 stores this process control firmware updating data, and updates the contents.

Figure 12:
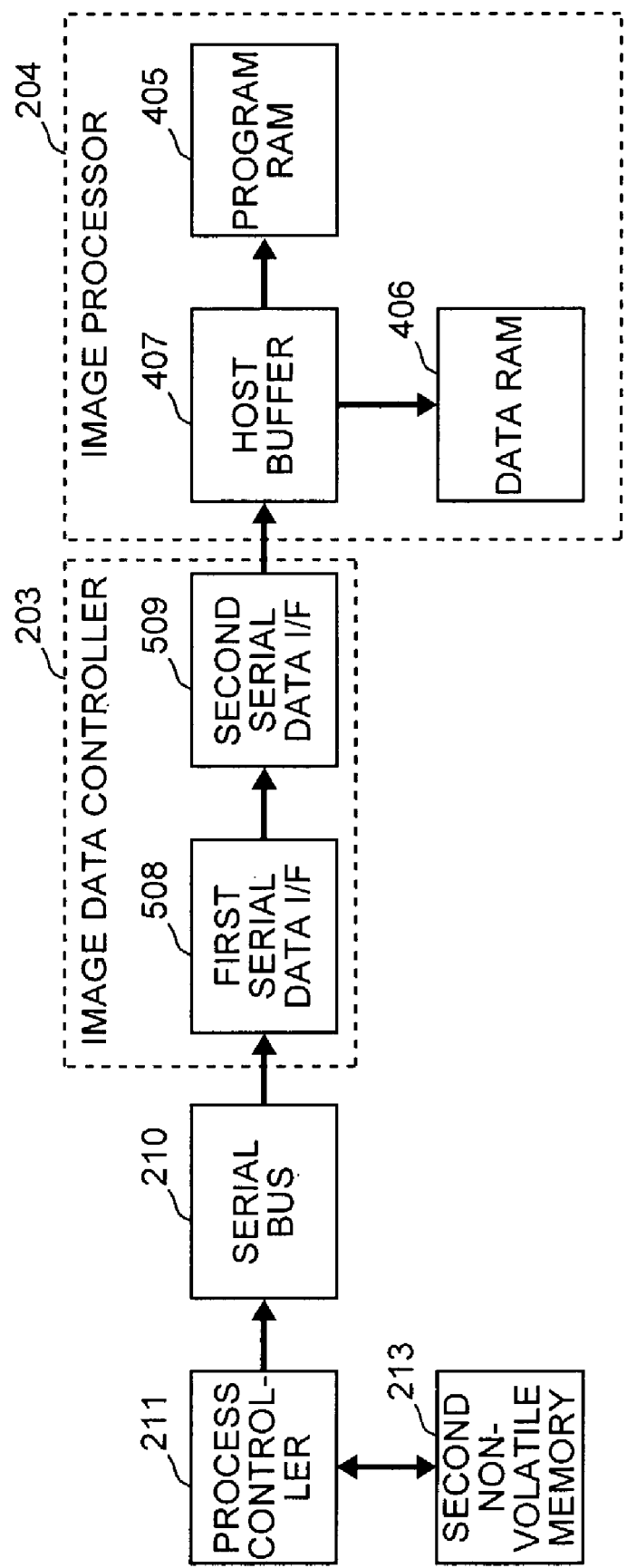
FIG. 12 is a flowchart for updating firmware according to the embodiment of the present invention.

FIG. 12 is a data flowchart for updating the functions of the image processor 204. It is possible to update the functions of the image processor 204 by programming by downloading the program from the support center to the processor array section 404.

The process controller 211 reads the processing procedure as the contents of the updating data and necessary parameters from the second non-volatile memory 213, and transfers these data to the image data controller 203 via the serial bus 210. The image data controller 203 transfers the updating data to image processor 204 via the first serial data I/F 508 and the second serial data I/F 509. The host buffer 407 of the image processor 204 stores the corresponding program into the program RAM 405, and stores the parameters into the data RAM 406. With the above arrangement, it is possible to update the functions of the image processor 204 by programming based on remote control.

Figure 13:
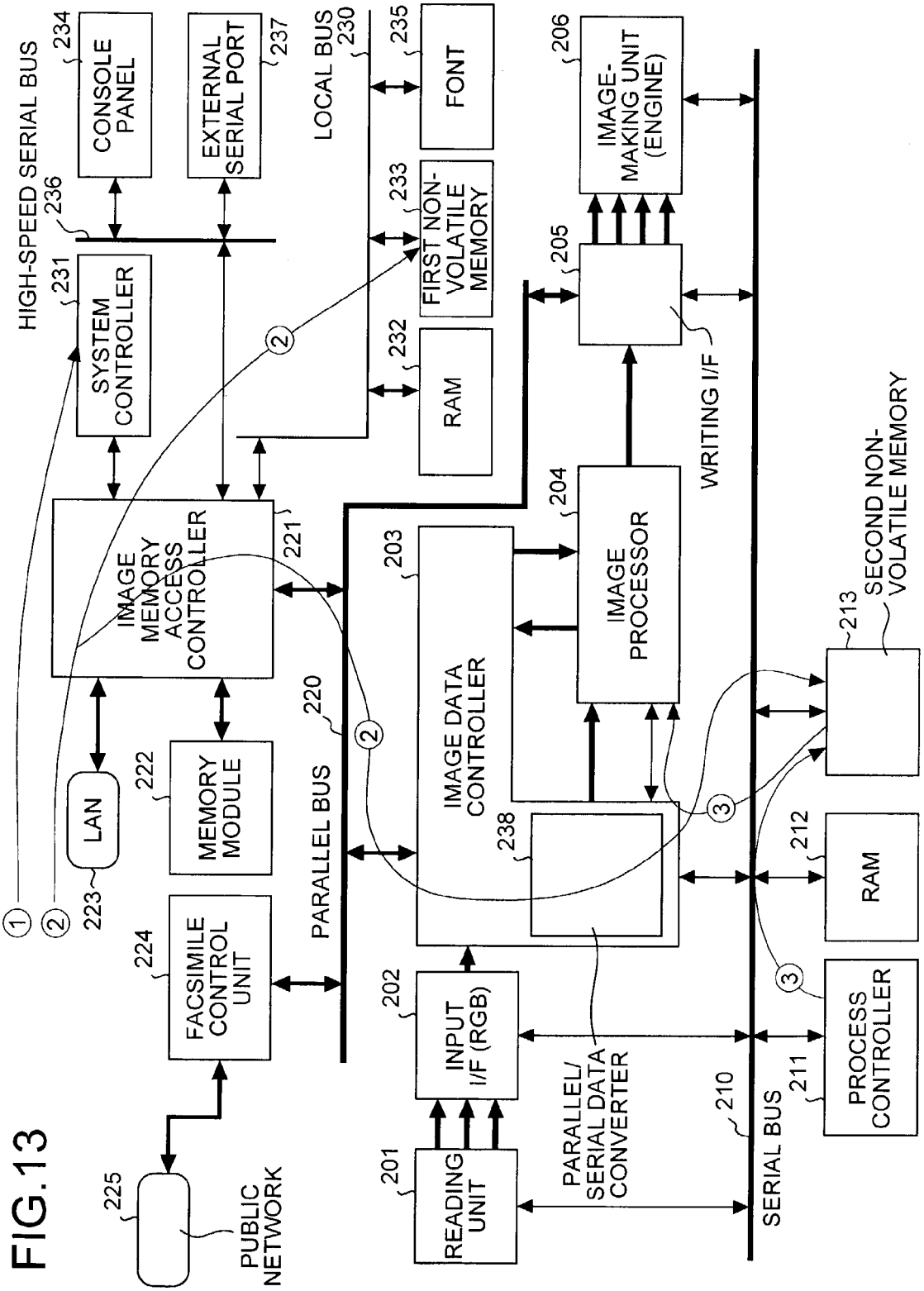
FIG. 13 is a block diagram that shows a data flow between the units for updating functions based on the input via a LAN according to the embodiment of the present invention.

FIG. 13 shows the data flow between the units to update the functions by remote control based on the input via the LAN 223. The sections that constitute the image processing apparatus in FIG. 13 are the same as those explained with reference to FIG. 2. FIG. 13 shows the data flow between these sections. The data flow of (1) in FIG. 13 shows the access to the system controller 231 explained with reference to FIG. 10. The data flow of (2) in FIG. 13 shows the updating of the firmware of the first non-volatile memory 233 and the second non-volatile memory 213 explained with reference to FIG. 11. The data flow of (3) in FIG. 13 shows the updating of the functions of the image processor 204 by the process controller 211 explained with reference to FIG. 12.

Updating via the Public Network

Figure 14:
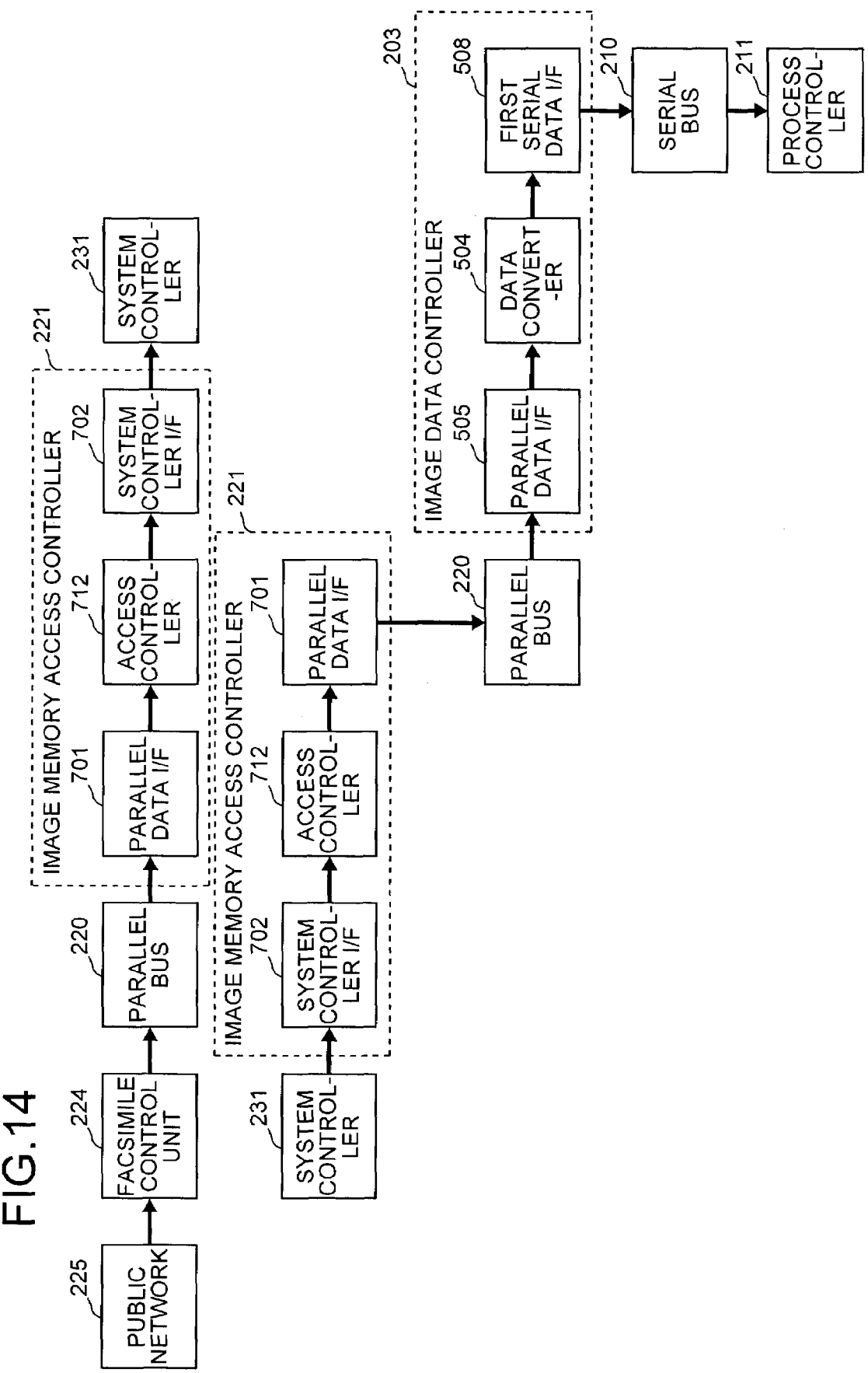
FIG. 14 is a data flowchart for updating a command based on the input to a public network according to the embodiment of the present invention.

FIG. 14 shows a data flowchart for updating the command. The facsimile control unit 224 receives the command updating data from the public network 225. The facsimile control unit 224 communicates with the system controller 231, via the parallel bus 220 and via the image memory access controller 221 (i.e., the parallel data I/F 701, the access controller 712, and the system controller I/F 702). The system controller 231 recognizes the command based on the header information of the transferred data.

The system controller 231 communicates with the process controller 211, via the image memory access controller 221 (i.e., the system controller I/F 702, the access controller 712, and the parallel data I/F 701), the parallel bus 220, the image data controller 203 (i.e., the parallel data I/F 505, the data converter 504, and the first serial data I/F 508), and via the serial bus 210, respectively. Based on the communications, the system controller 231 sets the image processing apparatus to the receiving state.

Figure 15:
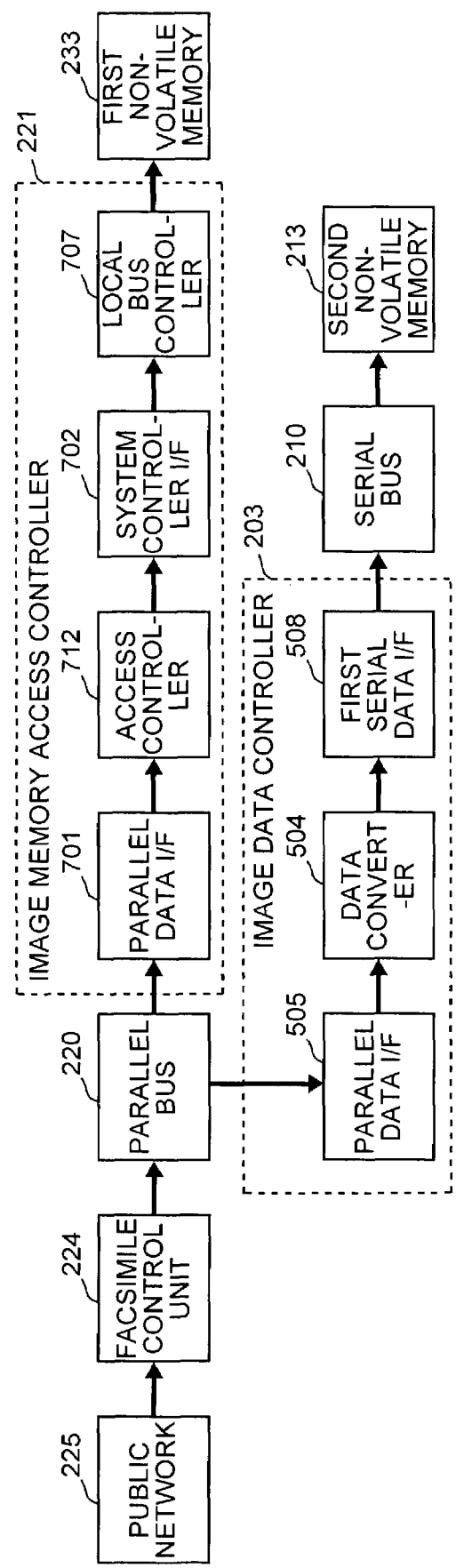
FIG. 15 is a data flowchart for updating firmware based on the input to a public network according to the embodiment of the present invention.

FIG. 15 is a data flowchart for updating the firmware based on the data input from the support center. For updating the firmware, the system controller 231 and the process controller 211 set the image processing apparatus to the updating waiting state. The facsimile control unit 224 obtains the firmware updating data from the support center via the public network 225. The image memory access controller 221 updates the contents of the first non-volatile memory 233 for system control, and the contents of the second non-volatile memory 213 for process control.

After the system controller 231 and the process controller 211 set the updating waiting state, the support center transfers the firmware updating data to the image memory access controller 221 via the public network 225. The facsimile control unit 224 transfers the received updating data to the image memory access controller 221 and the image data controller 203 via the parallel bus 220.

For updating the system control firmware, the facsimile control unit 224 transfers the system control firmware updating data to the first non-volatile memory 233, via the parallel bus 220, and via the parallel data I/F 701, the access controller 712, the system controller I/F 702, and the local bus controller 707 of the image memory access controller 221, respectively. The first non-volatile memory 233 stores this system control firmware updating data, and updates the contents.

For updating the process control firmware, the facsimile control unit 224 transfers the received process control firmware updating data to the second non-volatile memory 213, via the parallel bus 220, and via the parallel data I/F 505, the data converter 504, and the first serial data I/F 508 of the image data controller 203, respectively. The second non-volatile memory 213 stores this process control firmware updating data, and updates the contents.

The data flowchart for updating the functions of the image processor 204 via the public network 225 is similar to the data flowchart for updating the functions of the image processor 204 via the LAN 223 as shown in FIG. 12, and therefore, this data flowchart will be omitted. It is also possible to update the functions of the image processor 204 by programming based on remote control, in a manner similar to the updating of the functions via the LAN 223.

Figure 16:
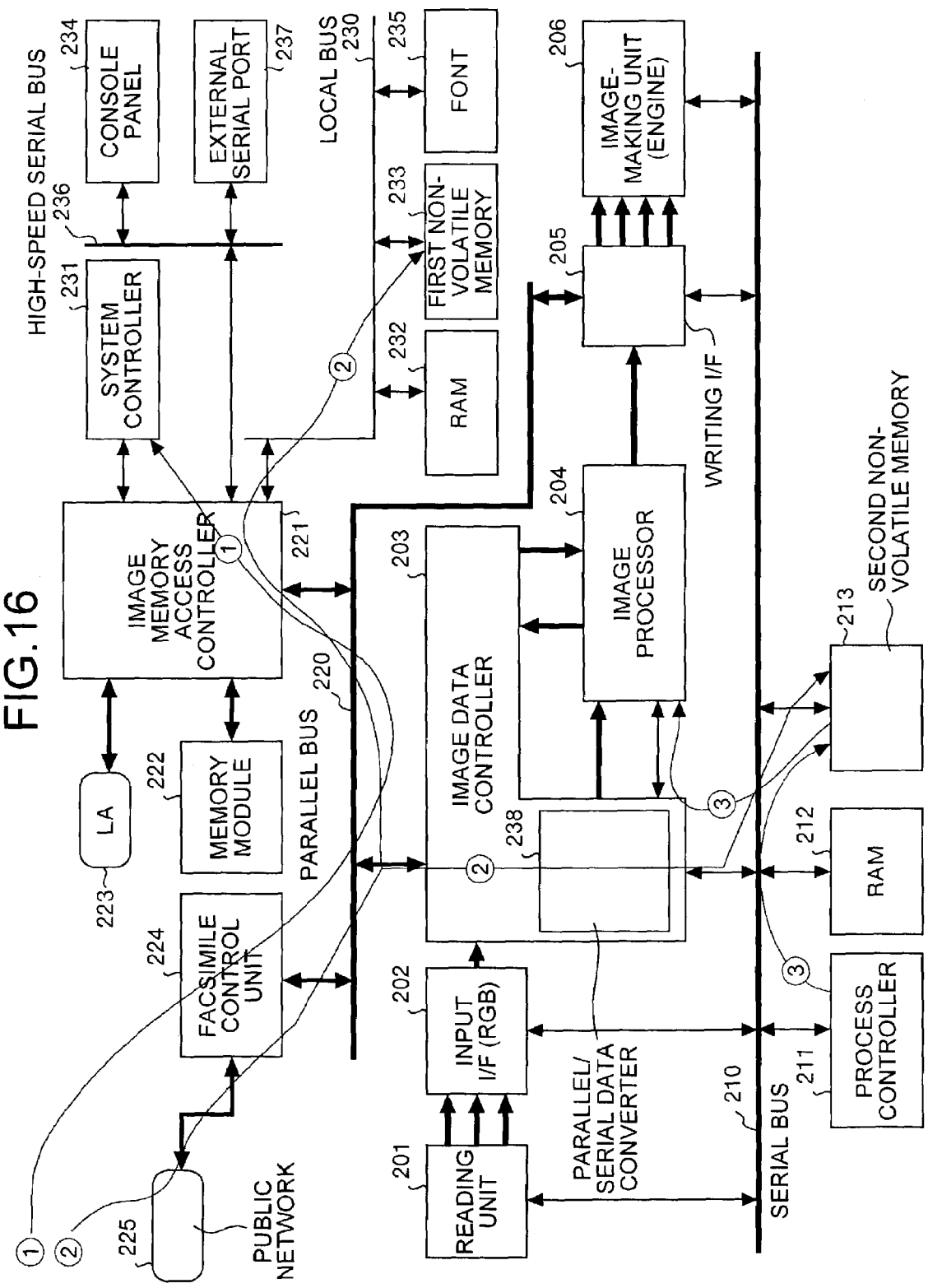
FIG. 16 is a block diagram that shows a data flow between the units for updating functions based on the input via a LAN according to the embodiment of the present invention.

FIG. 16 shows a data flow between the units for updating the functions by remote control based on the input via the public network 225. The sections that constitute the image processing apparatus in FIG. 16 are the same as those explained with reference to FIG. 2. FIG. 16 shows the data flow between these sections. The data flow of (1) in FIG. 16 shows the access to the system controller 231 explained with reference to FIG. 14. The data flow of (2) in FIG. 16 shows the updating of the firmware of the first non-volatile memory 233 and the second non-volatile memory 213 explained with reference to FIG. 15. The data flow of (3) in FIG. 16 shows the updating of the functions of the image processor 204 by the process controller 211 explained with reference to FIG. 12.

Monitoring From the Support Center

The remote support center (such as the external PC) that is connected via the LAN 223 or the public network 225 manages the state of the image processing apparatus, that is, the updating state of the firmware. It is possible to manage the updating state, by storing the updating state (firmware version number) of the firmware of the connected image processing apparatus. The support center transmits the updating command to each image processing apparatus that is connected to the support center. The image processing apparatus transmits the updated state to the support center. Based on this, it is possible to manage the communication state of the image processing apparatus.

Each image processing apparatus has individual identification information (ID) in advance. The support center can manage the state of updating the functions of each image processing apparatus, by recognizing the identification information.

Based on the above structure, the support center can manage the updating state of the processing functions of a plurality of image processing apparatuses. The support center can select the image processing apparatus that requires the updating of the functions, and update the functions of the selected image processing apparatus by remote control. It is also possible to collectively update the functions of the plurality of image processing apparatuses (i.e., updating of the version of the processing functions).

It is possible to update the functions of the image processing apparatus without requiring a technical service staff to go to the apparatus whenever the firmware is updated. For example, it is possible to solve the conventional inconvenience that the service staff each time goes to the installation position of the image processing apparatus to solve problems of the firmware of the old version.

It is possible to arrange such that the support center updates the functions by remote control at night when the image processing apparatus is not operating. It is also possible to arrange such that the support center updates the functions (updating of the firmware) while the image processing apparatus is not operating, by monitoring the operating state of the apparatus. Based on this arrangement, it is possible to update the functions of the image processing apparatus without involving the user's awareness about the updating work. It is possible to update the functions without interrupting the operation of the image processing apparatus and without lowering the work efficiency. The image processing apparatus has a function of responding to the enquiry about the using state from the support center.

Updating of the Functions From the Image Processing Apparatus Side

It is possible to connect between the image processing apparatus and the support center via a communication medium such as the Internet, instead of the connection via the LAN 223 or the public network 225. Based on this connection, the support center can remote-control the updating of the functions in a similar manner to that explained above. When the image processing apparatus and the support center are connected via the Internet, the support center can prepare a plurality of kinds of firmware corresponding to each version necessary for updating the functions, and make open the firmware of these versions on the Internet.

The image processing apparatus can selectively download the firmware of the necessary updating function (version) via the Internet. The operator operates the PC connected to the image processing apparatus to download the firmware, and the PC transfers the updating data of the processing functions to the image processing apparatus via the LAN 223. As a result, it is possible to update the processing functions of the image processing apparatus when the operator wants the updating.

It is possible to update the functions of the image processing apparatus without the remote control from the support center or the operation time of the image processing apparatus. For example, the operator of an image processing apparatus specifically requests the support center to prepare firmware of a processing function that is necessary for the image processing apparatus. The operator can make this request via the Internet, or by using the facsimile or telephone. The support center prepares the firmware of the special order, and transfers this firmware to the image processing apparatus by remote control. It is also possible to add a special processing function.

It is possible to realize the remote control method explained in the present embodiment, by arranging such that a personal computer or a computer in the work station executes a program prepared in advance. The program is recorded on a computer-readable recording medium such as a hard disk, a floppy disk, a CD-ROM, an MO, and a DVD. The computer reads the program from the recording medium, and executes the program. It is possible to distribute the program via the recording medium or via a network such as the Internet.

According to a first aspect of the present invention there is provided an image processing apparatus in which it is possible to update the processing functions of the image processing apparatus by remote control. Further, it is possible to update the functions of the image processing apparatus easily and smoothly. As the storing unit used for executing the operation stores the function updating data after the temporary storing unit stores this data via communications, it is possible to update the processing functions of the apparatus by remote control, without generating troubles in the operation of the apparatus, without lowering the processing efficiency of the apparatus, and without involving the operator's awareness. Further, there is an effect that it is possible to update the functions without requiring the operator to go to the apparatus installation position, and it is possible to improve the efficiency of the service work such as maintenance and inspections.

Moreover, there is an effect that the image processing apparatus can easily take in the updating data transmitted from the external unit via the network and update the functions.

Furthermore, there is an effect that the image processing apparatus can easily take in the updating data and update the functions in the general-purpose communication environment.

Moreover, it is possible to store the system control updating data and the process control updating data for updating the functions of the image processing apparatus, into mutually different temporary units. As a result, there is an effect that it is possible to smoothly take in the updating data, and improve the efficiency of updating the functions.

According to a second aspect of the invention there is provided a method of remote controlling an image processing apparatus in which it is possible to update the processing functions of the image processing apparatus by remote control. Further, it is possible to update the functions of the image processing apparatus easily and smoothly. As the storing unit used for executing the operation stores the function updating data after the temporary storing unit stores this data via communications, it is possible to update the processing functions of the apparatus by remote control, without generating troubles in the operation of the apparatus, without lowering the processing efficiency of the apparatus, and without involving the operator's awareness. Further, there is an effect that it is possible to update the functions without requiring the operator to go to the apparatus installation position, and it is possible to improve the efficiency of the service work such as maintenance and inspections.

Moreover, based on the remote control from the external apparatus connected via the communication network, the plurality of image processing apparatuses that have taken in the updating data can update the processing functions collectively or individually. As a result, there is an effect that it is possible to further improve the service work such as maintenance and inspections.

Furthermore, the remote apparatus can manage the current processing functions of the plurality of image processing apparatuses connected via the communication network. Based on this management, it is possible to remote control the updating of the processing functions of the image processing apparatus that requires the updating of the functions. As a result, there is an effect that it is possible to maintain in always the latest state the processing functions of image processing apparatuses that are located at different positions.

Moreover, the image processing apparatus can take in at a desired time the updating data that is necessary to update the functions. As a result, there is an effect that it is possible to improve the convenience of the function updating work.

The present document incorporates by reference the entire contents of Japanese priority document, 2002-052694 filed in Japan on Feb. 28, 2002.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An image processing apparatus comprising:
   a take-in unit that takes in a data for updating a function of a processing unit, the data for updating including program data for system control and process control data for process control;
   a temporary storing unit that temporarily stores the data for updating; and
   a data updating unit that reads the data for updating stored in the temporary storing unit and segregates the data for updating into a first storing unit into which the program data is stored and a second storing unit into which the process control data is stored, the program data and the process control data being used in the updating of the function of the processing unit.

2. The image processing apparatus according to claim 1, wherein the take-in unit takes in the data for updating via a network.

3. The image processing apparatus according to claim 1, wherein the take-in unit takes in the data for updating via the public telephone line.

4. A method of remote controlling an image processing apparatus comprising the steps of:
   taking in a data for updating a function of a processing unit from a remote apparatus via a communication line, the data for updating including program data for system control and process control data for process control;
   temporarily storing the data for updating; and
   reading the data for updating and segregating the data for updating into a first storing unit into which the program data is stored and a second storing unit into which the process control data is stored, the program data and the process control data being used in the updating of the function of the processing unit.

5. The method according to claim 4, wherein the remote apparatus transmits the data for updating collectively or individually to each of a plurality of image processing apparatuses that are connected to the communication line.

6. The method according to claim 5, further comprising:
   the image processing apparatus transmitting information about a current state of the image processing apparatus to the remote apparatus via the communication line; and
   the remote apparatus selectively transmitting data for updating the current state of the image processing apparatus to the image processing apparatus based on the information about the current state received from the image processing apparatus.

7. The method according to claim 4, wherein
   the remote apparatus makes open a program corresponding to the data for updating on the communication line, and
   the image processing apparatus or an external apparatus connected to the image processing apparatus can take in the data for updating via the communication line, and update the processing functions of the image processing apparatus.

8. An image processing apparatus comprising:
   a take-in unit that takes in a data for updating functions of a processing unit, the data for updating including program data for system control and process control data for process control of the image processing apparatus;
   a temporary storing unit that temporarily stores the data for updating, the temporary storing unit including a first temporary storing unit into which the program data for system control is stored and a second temporary storing unit into which the process control data for process control is stored; and
   a data updating unit that reads the data for updating stored in the temporary storing unit and stores the program data for system control into a first storing unit accessed by a system controller and the process control data for process control into a second storing unit accessed by a process controller, the program data and the process control data being used for updating the functions of the processing unit.

* * * * *